Patented Dec. 5, 1922.

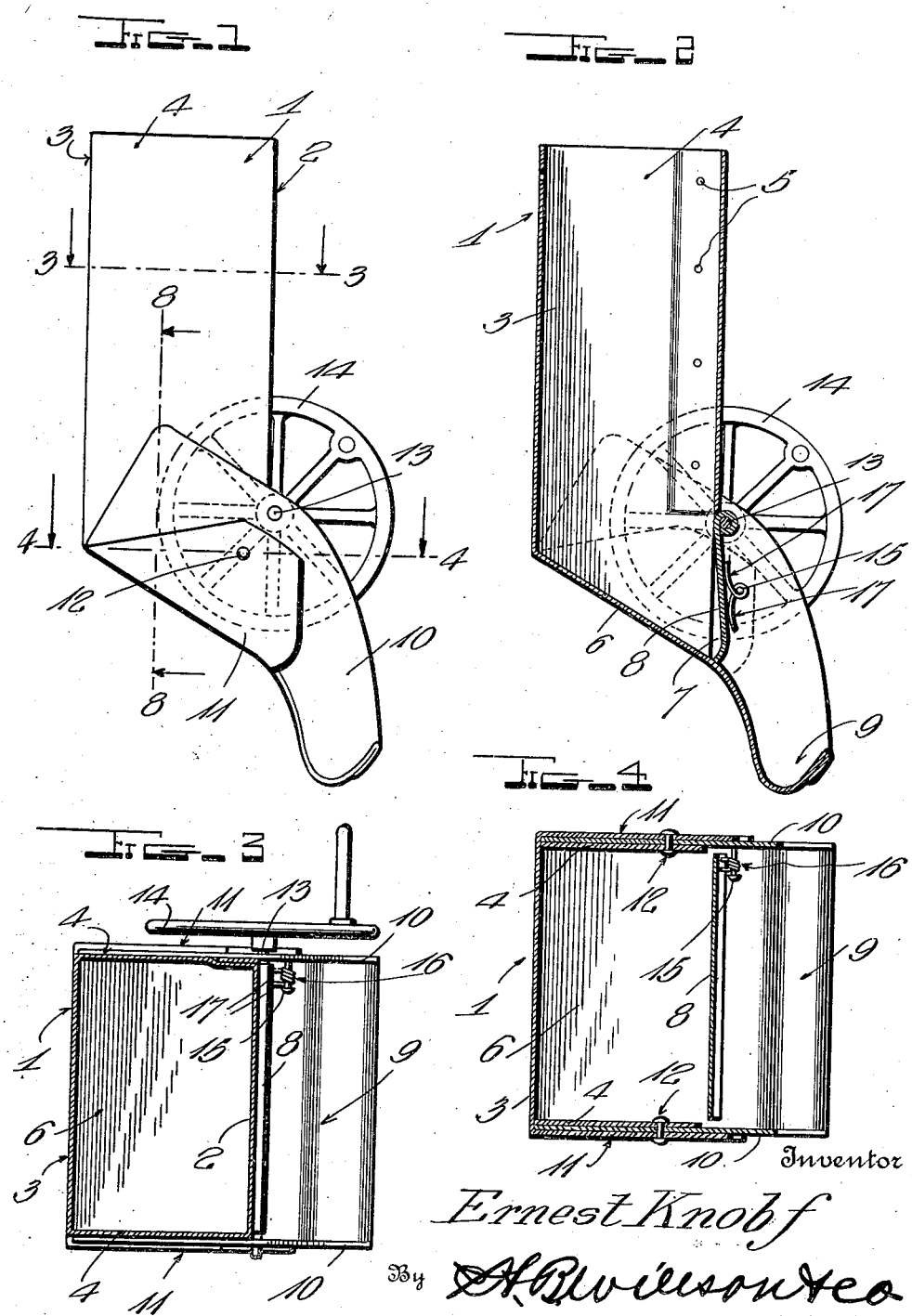

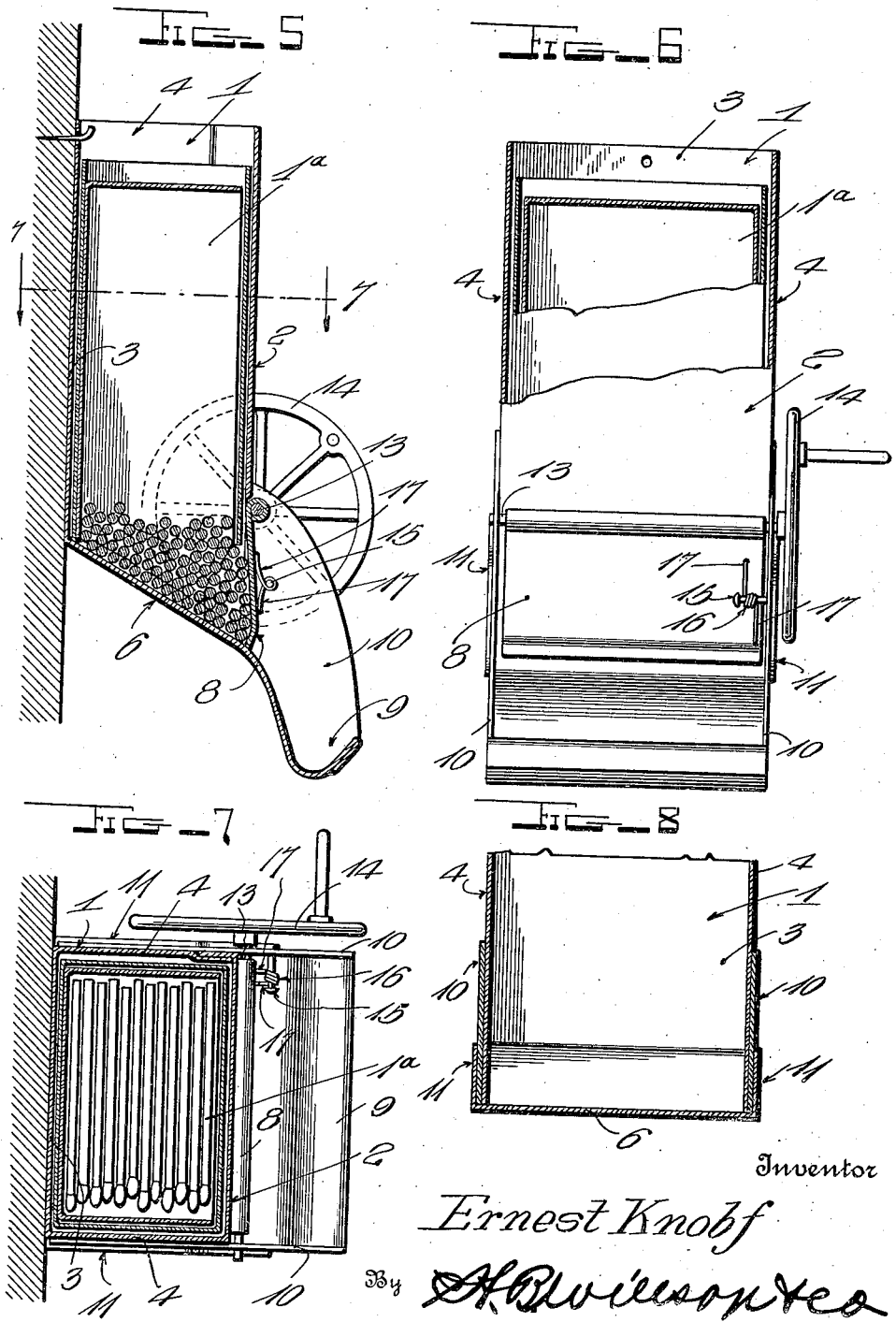

1,438,120

UNITED STATES PATENT OFFICE.

ERNEST KNOBF, OF REEDER, NORTH DAKOTA.

MATCH SAFE.

Application filed September 29, 1921. Serial No. 504,014.

*To all whom it may concern:*

Be it known that I, ERNEST KNOBF, a citizen of the United States, residing at Reeder, in the county of Adams and State of North Dakota, have invented certain new and useful Improvements in Match Safes; and I do declare the following to be a full, clear, and exact description of the invention, such as will enable others skilled in the art to which it appertains to make and use the same.

My invention relates to improvements in match safes and has for its object to provide a simple and inexpensive, yet a highly efficient and desirable device, capable of holding a large box of matches and discharging them as required for use.

With the foregoing in view, the invention resides in the novel subject matter hereinafter described and claimed, the descriptive matter being supplemented by the accompanying drawings.

Figure 1 is a side elevation of a match safe constructed in accordance with my invention.

Figure 2 is a central vertical sectional view.

Figures 3 and 4 are horizontal sectional views as indicated by the lines 3—3 and 4—4 of Fig. 1.

Figure 5 is a view similar to Fig. 2, but illustrating the manner in which an entire box of matches may be held within the safe.

Figure 6 is a front elevation partly broken away and in section.

Figure 7 is a horizontal sectional view as indicated by line 7—7 of Fig. 5.

Figure 8 is a detail vertical sectional view as designated by line 8—8 of Fig. 1.

In the drawings above briefly described, the numeral 1 designates a vertically elongated box of suitable size and shape to receive a large box of matches, as indicated by the reference numeral 1ª. The front wall 2, the back wall 3 and the side walls 4 of the box 1 are preferably bent from a single sheet of metal whose edges are secured together by rivets 5 or by any other preferred means. The lower end portion of the back wall 3 is bent forwardly to provide a forward declined bottom 6 and the front wall 2 terminates above said bottom to provide an opening 7 through which the matches may be discharged, this opening, however, being controlled by a gate 8. The bottom 6 is extended forwardly and downwardly beyond the gate 8 and has its front end curved upwardly as at 9 to form a channel for receiving the matches as they are discharged from the box 1. A pair of suitably shaped side plates 10 contact with the outer faces of the side walls 4 and have their front portions directed downwardly to co-operate with the extended and upwardly turned portions of the bottom 6 in forming a trough for the discharged matches. The bottom 6 is provided with integral side flanges 11 which are bent upwardly against the outer faces of the side plates 10, said flanges and plates being secured together in any preferred manner while the plates are similarly secured to the box sides 4. Rivets 12 are preferably provided for this purpose. The gate 8 might be mounted in any suitable way, but I prefer to secure the upper edge portion of said gate upon a rock shaft 13 which has its ends extended through the side plates 10, one end of said shaft being provided with an appropriate hand wheel or the like 14, whereby the shaft may be turned at will to open the gate and allow the discharge of a number of matches into the trough. While any adequate provision may be made for holding the gate in closed position, I prefer to rigidly secure an inwardly extending pin 15 to one of the side plates 10, to coil the central portion 16 of a length of spring wire around said pin, and to extend the ends of said wire into contact with the gate to form resilient arms 17. When the handle 14 is turned, the arms 17 yield and permit the necessary opening of the gate 8, but the moment said handle is released, the gate is closed by the spring. The gate preferably opens such a distance as to allow only one or very few matches to be discharged at a time.

When loading the box 1, a large box of matches 2 may be placed therein, it being necessary, however, to cut one end out of the match box as shown. When slipping the match box into the box 1, the latter is preferably removed from the wall or other support upon which it is hung so that it may be turned to such a position as to allow insertion of the match box without disturbing its contents.

Since excellent results may be obtained from the details disclosed, they are preferably followed. It is to be understood, however, that within the scope of the invention as claimed, numerous minor changes may be made.

I claim:

1. A match safe comprising a box having a forwardly declined bottom and having its front wall spaced above said bottom to form a match outlet, a trough for receiving the matches as they are permitted to slide down said bottom, said trough having side walls extending to said box, a gate between said side walls for controlling the discharge of matches from the box, a shaft to which the upper edge of said gate is secured, said shaft passing rotatably through said side walls, and an operating handle on one end of said shaft.

2. A structure as specified in claim 1, together with a pin rigidly secured to one of said side walls and extending inwardly therefrom, and a wire coiled around said pin with its ends extended to form resilient arms bearing against said gate to yieldably hold the latter in closed position.

In testimony whereof I have hereunto set my hand.

ERNEST KNOBF.